(12) United States Patent
Shindelar et al.

(10) Patent No.: US 8,646,488 B1
(45) Date of Patent: Feb. 11, 2014

(54) PROTECTIVE CAP FOR PIPE AND TUBE ENDS

(76) Inventors: John Oliver Shindelar, Coeur d'Alene, ID (US); Stuart M Zinke, Coeur d'Alene, ID (US)

( * ) Notice: Subject to any disclaimer, the term of this patent is extended or adjusted under 35 U.S.C. 154(b) by 969 days.

(21) Appl. No.: 12/715,640

(22) Filed: Mar. 2, 2010

Related U.S. Application Data (60) Provisional application No. 61/167,445, filed on Apr. 7, 2009.

(51) Int. Cl.
    *B65D 59/06* (2006.01)
(52) U.S. Cl.
    USPC ............................. 138/96 R; 138/89; 138/104
(58) Field of Classification Search
    USPC .......................................... 138/104, 96 R, 89
    See application file for complete search history.

(56) References Cited

U.S. PATENT DOCUMENTS

| | | | |
|---|---|---|---|
| 2,321,667 A | 6/1943 | Foster et al. | |
| 3,104,681 A | 9/1963 | Gray, Jr. et al. | |
| 3,821,969 A * | 7/1974 | Sinko | 138/89 |
| 3,987,930 A | 10/1976 | Fuson | |
| 4,095,810 A * | 6/1978 | Kulle | 138/96 R |
| 5,197,605 A * | 3/1993 | Hampton | 206/582 |
| 5,224,515 A * | 7/1993 | Foster et al. | 138/89 |
| 5,499,737 A * | 3/1996 | Kraus | 220/787 |
| 5,568,708 A * | 10/1996 | Kassardjian et al. | 52/301 |
| 5,915,418 A * | 6/1999 | Turner | 138/89 |
| 6,058,977 A * | 5/2000 | Hotta | 138/89 |
| 6,176,267 B1 * | 1/2001 | Dugan et al. | 138/89 |
| 6,688,336 B2 * | 2/2004 | Trichard | 138/89 |
| 7,328,723 B1 | 2/2008 | Van Meter | |
| 2008/0053548 A1 * | 3/2008 | Ellery | 138/104 |
| 2008/0190509 A1 * | 8/2008 | Cox | 138/96 R |

* cited by examiner

*Primary Examiner* — James Hook
(74) *Attorney, Agent, or Firm* — John C. Meline (57) ABSTRACT

Described is a device for protecting a pipe, tube or conduit end that is left open or exposed without a fixture or terminating end. Instead of tape placed over an open pipe end, a specially shaped and marked protective cap provides a seal and a unique marker for each pipe end. The marker may be color coded, bar coded or numbered. Such protective cap seals pipe ends against moisture, dirt and other debris thereby reducing or eliminating corrosion. Such protective cap reduces installation time as compared to removing tape and tape residue from each pipe end. The unique marker can indicate the purpose and identity of each underlying pipe or tube. Such protective cap also improves the visibility of the pipe ends during construction thereby increasing the safety of a job or construction site.

9 Claims, 5 Drawing Sheets

PROTECTIVE CAP FOR PIPE AND TUBE ENDS

CROSS-REFERENCE TO RELATED APPLICATIONS

This application claims the benefit and priority of U.S. Provisional Application having Ser. No. 61/167,445 which was filed on Apr. 7, 2009. The aforementioned patent application is herein incorporated by reference in its entirety.

FIELD OF INVENTION

The present invention relates to a cap for protecting and identifying the end of a pipe, tube or conduit.

BACKGROUND

During construction, pipes and tubes are often left partially installed for weeks and months at commercial, residential and other sites. For example, portions of plumbing systems are often installed ahead of concrete pourings of a residence. Delays between construction stages are inevitable. Open ends or stubs of partially installed pipes and tubes are often covered in duct tape or other temporary protective material and left until the remainder of the project can be completed. The temporary protective material is meant to keep the pipe ends free from debris until properly or completely finished.

After a delay, when workers return to finish a project, it is a time-consuming activity to remove the temporary material from each pipe or tube end (stubs). Any duct tape must be adequately removed from each pipe end. Residual tape is often difficult to completely remove from the end of the pipe especially if there is any pipe threading present. Further, the purpose of each pipe must be re-identified so as to determine how to finish the work. For example, one of several pipes may be meant for protection of electric lines while another might be for water, drainage or natural gas.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

One aspect of the present invention provides an improved device for removably covering the end or stub of a pipe, tube or conduit. A protective cap is comprised of a protective sleeve portion and a closed tip portion. The protective sleeve portion is shaped, designed or treated so as keep debris from the pipe or tube and to facilitate removal of the protective cap from the pipe or tube. The protective cap can be used in a variety of circumstances including between the time a rough-in is constructed and the time fixtures are installed. The closed tip portion is shaped so as to facilitate removal of the protective cap and for working with the pipe, tube or conduit during various phases of construction.

Another aspect of the present invention provides a convenient method for marking each stub end of a pipe, tube or conduit. The shape, color, text or other aspect of the protective cap may indicate the size, purpose or function of the corresponding pipe, tube or conduit.

These and other aspects of the invention are described further in the Detailed Description.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter, as well as a preferred mode of use, are best understood by reference to the following Detailed Description of illustrative implementations when read in conjunction with the accompanying drawings, wherein:

DETAILED DESCRIPTION

While the invention is described below with respect to a preferred implementation, other implementations are possible. The concepts disclosed herein apply equally to other devices for protecting or plugging the ends of pipes, tubes and conduits. Furthermore, the concepts applied herein apply more generally to the protection and identification of pipes, tubes, conduits and other materials. The invention is described below with reference to the accompanying figures.

As used herein, the term "pipe" refers broadly to a pipe, tube, conduit, and any other elongated tube-like object suitable for conveying utilities such as water and gas, and wires for electric, phone or data transmission, and the like including drainage pipes. In this application, the terms "pipes" and "pipe ends" may be used interchangeably.

Described is a device for protecting a pipe end that is left open or exposed without a fixture or terminating end. Instead of tape placed over an open pipe end, a specially shaped and marked protective cap provides a seal and a unique marker for each pipe end. The unique marker may be color coded, bar coded, numbered or otherwise uniquely identified. Such protective cap seals pipe ends against moisture, dirt and other debris thereby reducing or eliminating corrosion. Such protective cap reduces installation time as compared to removing tape and tape residue from each pipe end before subsequently working or finishing each pipe end. The unique marker can indicate the purpose and identity of each underlying pipe, tube or conduit. Such protective cap also improves the visibility of the pipe ends during construction thereby increasing the safety of a job site.

Figures 1, 1A:
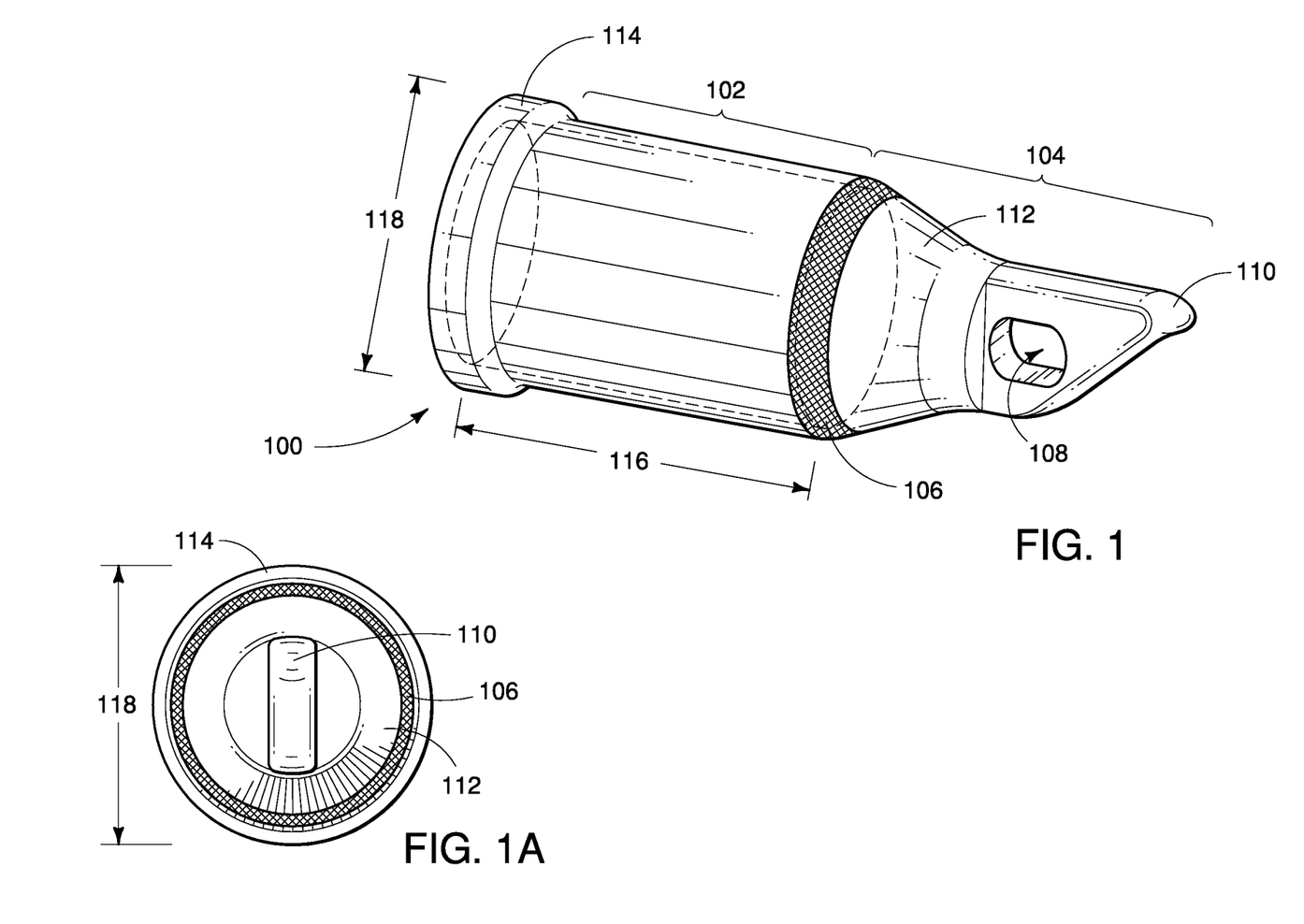
FIG. 1 is a perspective view of a protective cap according to a first exemplary implementation.
FIG. 1A is an overhead view of the protective cap shown in FIG. 1.

FIG. 1 is a perspective view of a reusable protective cap according to a first exemplary implementation of the subject matter. With reference to FIG. 1, a protective cap 100 is comprised of a protective sleeve portion 102 and a closed tip portion 104. In a preferred implementation, the protective cap, or its components, are made from a sturdy, durable, weather resistant, and preferably lightweight material. The protective cap can be easily cleaned and reused. In another implementation, the protective cap is made from recycled material. In yet another implementation, the protective cap is made from a biodegradable or recyclable material so that when the protective cap is ready to be take out of service, the protective cap can be disposed of in an environmentally conscious fashion.

The closed tip portion 104 comprises an identifying ring 106 that preferably has a distinguishing color, texture, marking or text (not shown) that can uniquely identify the protective cap 100 from other protective caps. The marking may be unique across all protective caps or may be unique from other protective caps in a locality. For example, a blue identifying ring 106 may indicate that the corresponding pipe is for potable water.

The closed tip portion 104 has a tapered section 112 that is tapered on its outer surface and is more narrow or pointed toward the distal end 110 to facilitate any necessary installation of a pipe or pipe segment (not shown). For example, an installer may need to pass a pipe segment through a closed material at a construction site such as passing a pipe segment through dirt, wet cement, insulation or construction material. The protective cap 100 not only serves to temporarily close and protect the end of a pipe or pipe segment to prevent debris from entering the pipe or pipe segment, the protective cap 100 also serves as a tool to guide a pipe segment into a final destination.

The closed tip portion 104 also comprises an open loop 108 which allows for a finger, hook, rope or string to be applied to the protective cap 100 to facilitate working with the engaged end of the pipe or tube. The open loop 108 also facilitates removal of the protective cap 100 with application of an appropriate axial force. The axial force may be combined with a twisting motion to facilitate disengagement of the protective cap 100 from a pipe end. The protective sleeve portion 102 may comprise a flanged or thickened proximal end 114 to increase the durability of the protective cap 100. The length 116 of the protective sleeve portion 102 is sufficient to allow for ease of manually applying and removing the protective cap 100 from a pipe or tube end. In one implementation, the length 116 is about the width of a human hand or the width of a couple of human fingers. Other lengths 116 may be selected based upon the diameter 118 of the protective cap 100 or based upon one or more other factors. Thus, a protective cap 100 may be of any size to match the size, purpose or material of a pipe, tube or conduit. In one implementation, the protective sleeve portion 102 is tapered along its length 116 for a snug or secure fit without the use of an adhesive or sealant. The taper may be in either direction.

The tapered section 112 of the closed tip portion and the open loop 108 may be made from the same or different material and may be made separately or formed as one piece of material. The protective sleeve portion 102 may also be made separately or formed as part of the tapered section 112 and part of the open loop 108.

FIG. 1A shows an overhead view of the protective cap 100 shown in FIG. 1. With reference to FIG. 1A, a flanged or thickened proximal end 114 has the widest diameter 118. From the overhead view, one or more identifying rings 106 are visible. Next a tapered section 112 is visible leading up to the distal end 110 or tip of the protective cap 100.

Figures 2, 2A:
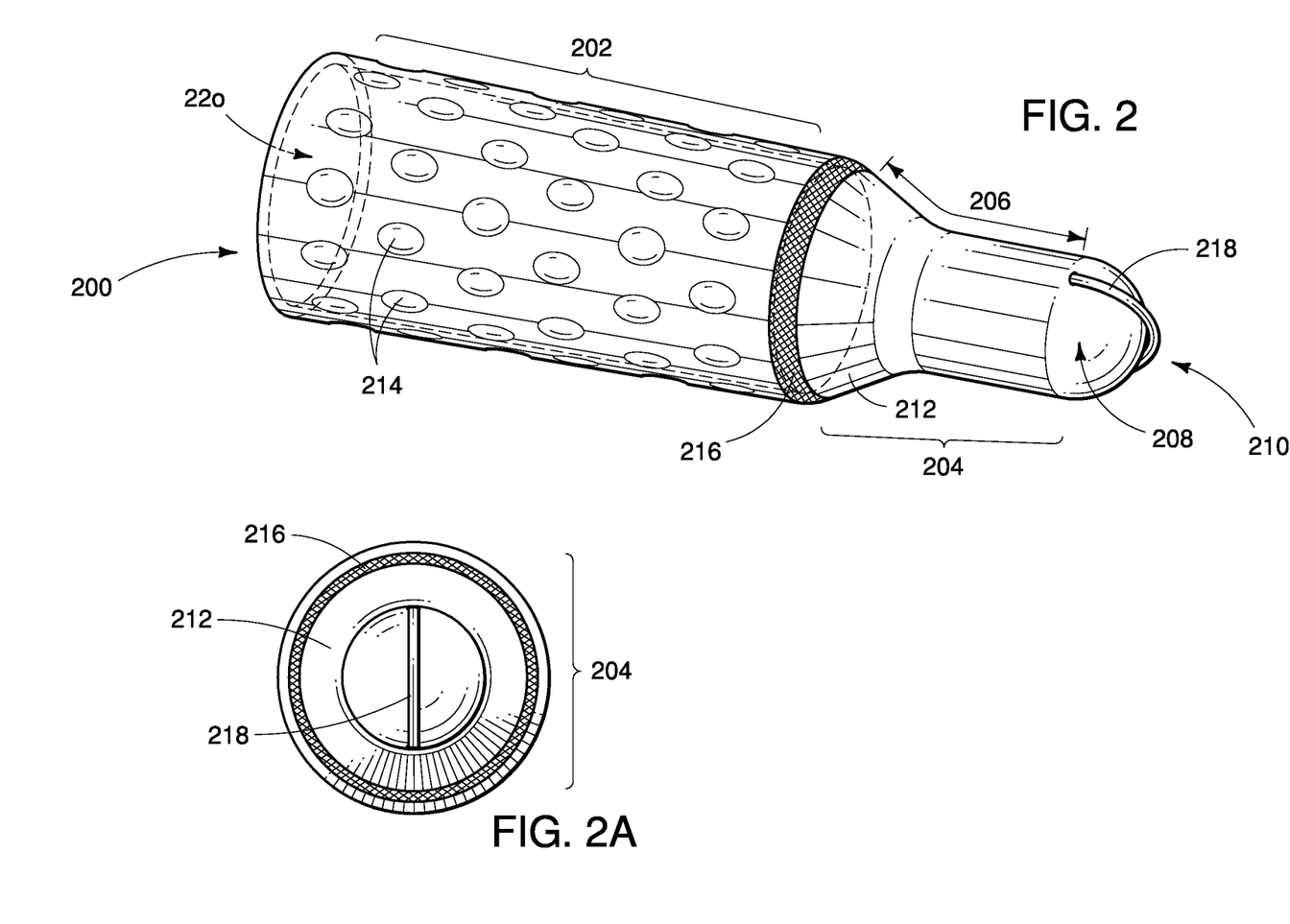
FIG. 2 is a perspective view of a protective cap according to a second exemplary implementation.
FIG. 2A is an overhead view of the protective cap shown in FIG. 2.

FIG. 2 is a perspective view of a protective cap 200 according to a second exemplary implementation of the subject matter. With reference to FIG. 2, a protective cap 200 comprises a protective sleeve portion 202 and a closed tip portion 204. The height 206 of the closed tip portion 204 may vary. The distal end 210 of the closed tip portion 204 may comprise a ring 218 or loop for attaching a rope, hook or other implement (not shown). The ring 218 may be made from a relatively hard material (e.g. metal) as compared with the material of the closed tip portion 204. The closed tip portion comprises a sloping tapered or rounded section 212. The closed tip portion 204 also comprises an identifying ring 216. The identifying ring 216 may comprise text, texture color or other marking which uniquely identifies the cap and thus the corresponding pipe on which the protective cap 200 is placed.

The sleeve portion 202 may comprise a texture, bumps, divots, relatively small recesses or other type or types of gripping features 214 which serve in part to provide an improved gripping surface for laborers during installation and removal of the protective cap 200. The gripping features may be filled with, or comprised of, an alternative material or colored with a contrasting color as compared to the material of the sleeve portion 202. A contrasting color can serve as an unique identifier in addition to or in place of one or more identifying rings 216. The color or colors may be applied in a pattern or style which may aid in uniquely identifying the pipe ends or which may aid in uniquely identifying which pipes a particular worker previously worked on. Thus, a worker, supervisor or other entity could quickly identify which portions of a construction site that a particular worker contacted. Thus, a protective cap could identify the work of a particular one of a plurality of workers.

Alternatively, instead of (or in addition to) recesses 214, raised bumps or mounds (not shown) may be formed or attached to the sleeve portion 202. such raised bumps could also serve to aid gripping and manipulating the protective cap 200 and could also serve to uniquely identify the protective cap 200. For example, the pattern of the recesses 214 or bumps could serve as the identifying characteristic for a given protective cap 200. In a preferred implementation, the length of the sleeve portion 202 is about the width of a human hand.

In one implementation, the protective cap 200 is reversible in the sense that either the proximal end 220 or distal end 210 may be engaged in or on a pipe end. When a pipe has a traditional pipe end (not shown), the proximal end 220 and sleeve portion 202 are fit over the pipe end. In addition, the distal end 210 may be placed into a traditional pipe end such that the sloping tapered section 212 or a portion of the closed tip portion 204 engages into the traditional end of the pipe thereby causing a sealing effect. When a pipe or tube has a bell end or bell opening (not shown), the distal end 210 may be placed into the bell end such that the sloping tapered section 212 or a portion of the closed tip portion 204 engages into the bell end of the pipe thereby causing a sealing effect. The shape along the length of the protective cap 200 is thus appropriately formed. In a preferred implementation, the shape along the length of the protective cap 200 is formed to correspond to standard sizes (e.g. diameters) of pipe, tube or conduit. Other implementations of protective cap beyond the implementation shown in FIG. 2 may be reversible.

FIG. 2A shows an overhead view of the protective cap 200, and specifically the visible closed tip portion 204 of the protective cap 200, shown in FIG. 2. With reference to FIG. 2A, an identifying ring 216 has the widest diameter. Next a tapered section 212 is visible leading up to a hardened ring 218 at the distal end of the protective cap 200. In another implementation, the hardened ring 218 may serve in place of an identifying ring 216 or may serve as an identifier in addition to any identifying ring 216.

Figure 3:
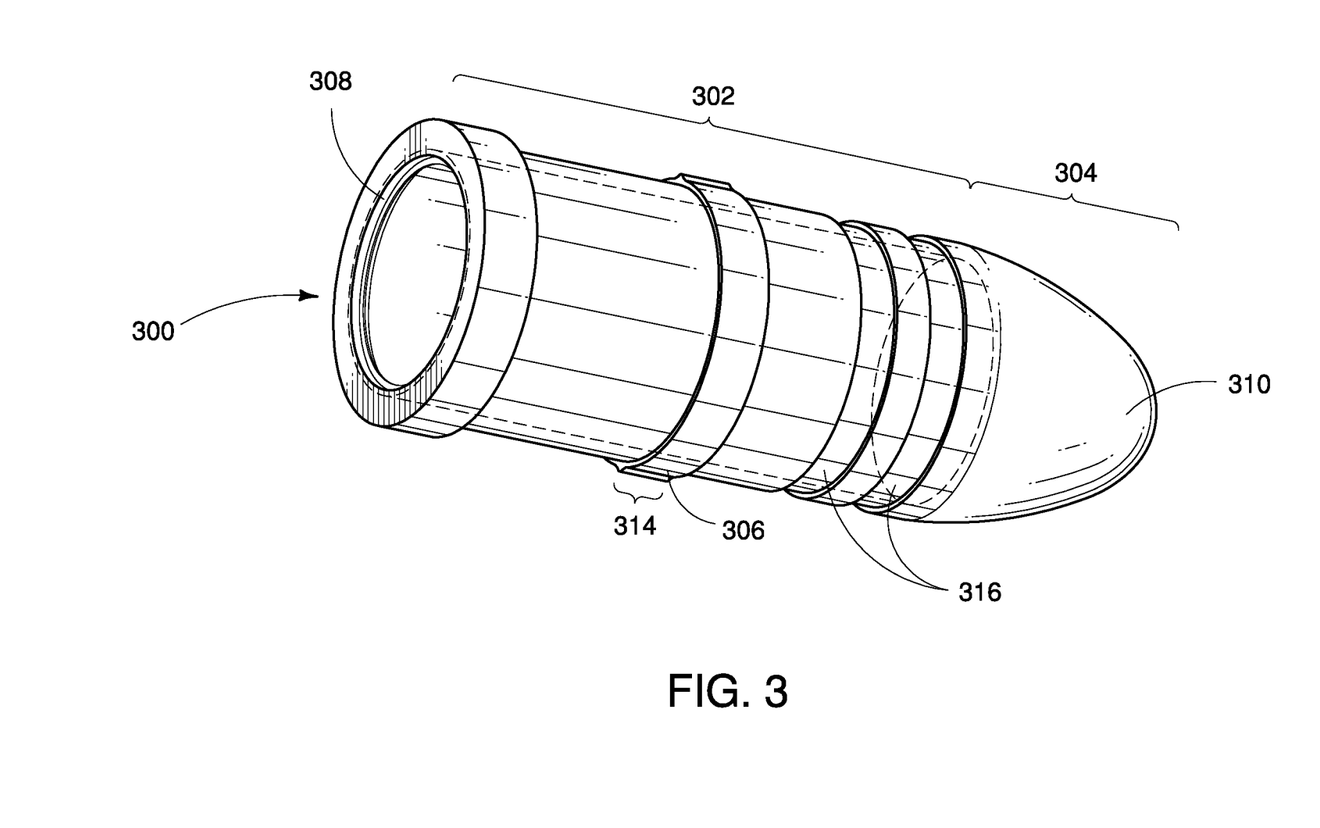
FIG. 3 is a perspective view of a protective cap according to a third exemplary implementation.

FIG. 3 is a perspective view of a protective cap 300 according to a third exemplary implementation of the subject matter. With reference to FIG. 3, a protective cap 300 comprises a protective sleeve portion 302 and a closed tip portion 304. The distal end 310 of the closed tip portion 304 is rounded to facilitate insertion or manipulation of a corresponding pipe segment or pipe end (not shown) at a construction site such as inserting a pipe segment through dirt. The shape of the closed tip portion 304 may be formed to match the particular task at hand (e.g. passing a pipe segment through dirt versus passing the pipe segment through a pre-formed channel).

In a preferred implementation, the closed tip portion 304 is made from a durable material, a material that may be the same or different material than the protective sleeve portion 302. The closed tip portion 304 and the protective sleeve portion 302 may be formed in the same molding process or may be formed separately and subsequently assembled together.

The sleeve portion 302 may comprise a sealing ring 308 on the proximal end of the protective cap 300. In a preferred implementation, the sealing ring 308 is made from a material that provides a liquid barrier. When the protective cap 300 is applied to the end or stub of a pipe, the protective cap 300 prevents liquids from entering the pipe until the protective cap 300 is removed. The sealing ring 308 may be attached to or may be formed as part of the sleeve portion 302. The sealing ring 308 may be located on the proximal end of the sleeve portion 302 or inside the sleeve portion 302 or closed top portion 304. In one exemplary implementation, the sealing ring 308 snaps onto the proximal end of the sleeve portion 302 and may be added to a protective cap 300 as needed or desired.

The sleeve portion 302 also comprises one or more marking grooves 316. A marking ring 306 may be engaged into a marking groove 316. The marking ring 306 may be removably or permanently engaged into such a marking groove 316. Each marking ring 306 is comprised of one or more colors, patterns, bands, stripes, textures or other feature or features which serve to distinguish one marking ring 306 from another. Correspondingly, a protective cap 300 having one or more marking rings 306 may be distinguished from another protective cap. In this way, a worker or other viewer is able to distinguish a capped pipe or pipe stub from another. Alternatively, each marking ring 306 may be numbered thereby providing a number to each corresponding protective cap 300. The number or marking may correspond to an engineering or other construction drawing.

A marking ring 306 may be of any width 314 or shape. Correspondingly, a marking ring 306 may take other forms such as a marking button, a marking tab or vertical marking notch (not shown). In an exemplary implementation of a marking tab, a user selects one of several tabs embedded in a vertical marking notch, removes the tab and thereby exposes a section of the sleeve portion 302 that comprises a different color than the sleeve portion 302. One or more of a plurality of different or distinguishing colors may thus be exposed to view.

Figures 4, 4A:
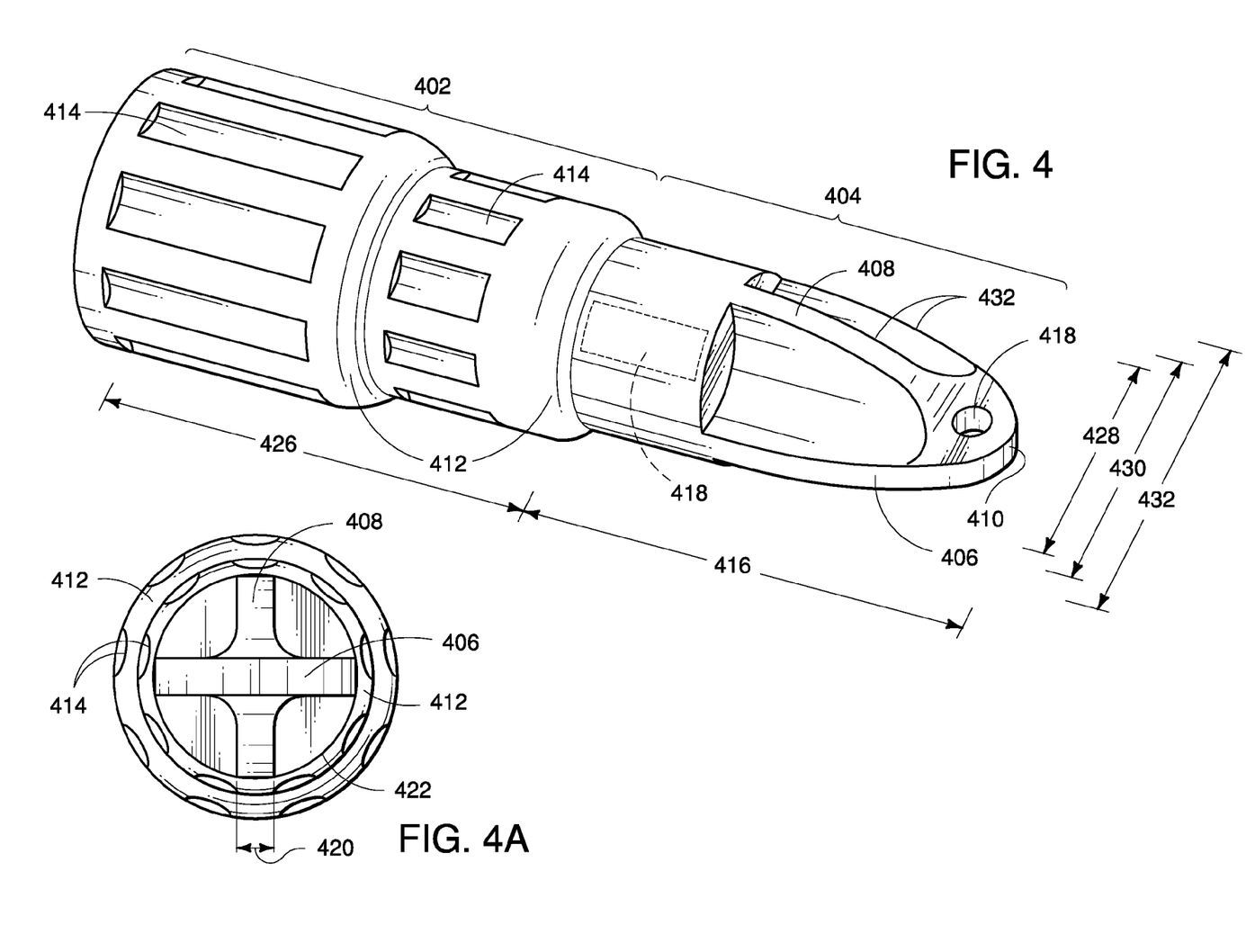
FIG. 4 is a perspective view of a protective cap according to a fourth exemplary implementation.
FIG. 4A is an overhead view of the protective cap shown in FIG. 4.

FIG. 4 is a perspective view of a protective cap 400 according to a fourth exemplary implementation of the subject matter. With reference to FIG. 4, a protective cap 400 comprises a protective sleeve portion 402 and a closed tip portion 404. The protective sleeve portion comprises a tapered section 412. The distal end 410 of the closed tip portion 404 is pointed to facilitate any needed insertion or manipulation of a corresponding pipe segment or pipe end (not shown) at a construction site. The distal end 410 comprises a void or passage 418. The void or passage 418 may be used to attach a string or tag for marking the protective cap 400.

The closed tip portion 404 comprises major blades 406 and minor blades 408. In one implementation, the major blades 406 and minor blades 408 are arranged somewhat similar to the tip of a phillips screwdriver. In other implementations, the number of major blades 406 is arbitrary and the number of minor blades 408 is arbitrary. The closed tip portion 404 may be of any height 416. In a preferred implementation, the height 416 is about one-third to about one-half the length 426 of the sleeve portion 426. The shape of the major blades 406 and minor blades 408 may vary along their length or in other dimensions.

The major blades 406, or minor blades 408, or a combination of major blades 406 and minor blades 408, may serve as a reamer or de-burring tool when working with a pipe end. For example, when a pipe is made of PVC, and when the pipe is cut, it is often desirable to remove any debris or burs left behind by the cutting. This action can be done by inserting the closed tip portion 404 into the open and freshly cut end of a pipe and rotating the protective cap until the protective cap cleans the debris or remnants of shavings left behind on the pipe end. The edges of the major blades 406 and minor blades 408 can thus be formed or shaped to perform this and other functions.

With reference to FIG. 4, the protective sleeve portion 402 or the closed tip portion 404 may comprise an identifying region 418. In a preferred implementation, the identifying region comprises identifying text. The identifying region or text may be of any size, texture, color or shape.

In a preferred implementation, the protective sleeve portion 402 comprises recessed grooves 414 or other gripping features. The recessed grooves 414 may be of any size or shape (e.g. length, width, orientation). The recessed grooves 414 may be the same or different color than other parts of the protective cap.

The protective cap 400 may comprise a plurality of diameters. The closed tip portion 402 may comprise one or more outer diameters 428 that corresponds to an inner diameter of a pipe end (not shown). The closed tip portion 402 may then be inserted into an open end of a pipe end, thus sealing the pipe end. Just one outer diameter 428 is shown in FIG. 4. However, the closed tip portion 402 may be formed so as to comprise multiple cascading outer diameters to accommodate a variety of inner pipe diameters with the same protective cap 400.

The protective sleeve portion 402 may also be formed into a plurality of diameters. FIG. 4 shows the protective sleeve portion 402 formed into a first inner diameter 430 and a second inner diameter 432. The first inner diameter 430 may correspond to a first outer diameter of a pipe end and the second inner diameter 432 may correspond to a different or second out diameter of a pipe end. Thus, the protective cap 400 may be serviceable for two or more outer pipe diameters. For example, a protective cap 400 may serve to protect the end of a ¾ inch pipe or a 1 inch pipe. The plurality of diameters may be chosen based on typical or standard pipe, tube or conduit sizes or may be arbitrarily chosen so as to maximize the possible utility of the protective cap.

FIG. 4A is an overhead view of the protective cap 400 shown in FIG. 4. With reference to FIG. 4A, the major blades 406 and minor blades 408 may be of any width 420. In a preferred embodiment, the width 420 of the blades is sufficient such that the closed top portion 404 can withstand substantial torquing and other forces such as when forces are applied to facilitate removal of the protective cap from a pipe end. The major blades 406 and minor blades 408 serve to enhance secure gripping of the protective cap 400 by a hand or by a tool.

FIG. 4A shows a boundary 422 between the protective sleeve portion 402 and the closed tip portion 404. However, such boundary 422 may be actual or conceptual. The boundary 422 is actual when the closed top portion 404 is made separately from the sleeve portion 402 and the two portions are mated together. The boundary 422 is conceptual when the closed tip portion 404 and the protective sleeve portion 402 are made at the same time, in the same process or in the same mold. Thus, the protective sleeve portion 402 and the closed tip portion 404 may be one piece.

Other implementations are possible. The protective sleeve portion 402 may be made of the same or different material as the closed tip portion 404. These portions may be made out of any suitable material including wood, metal or plastic. In one implementation, the portions are made from one or more of polyvinyl chloride (PVC), unplasticized polyvinyl chloride (uPVC), chlorinated polyvinyl chloride (cPVC), polyvinylidene fluoride (PVDF), polyethylene (PE), polypropylene (PP), cross-linked polyethylene (PEX), acrylonitrile butadiene styrene (ABS), or polybutylene (PB). In another implementation, the protective cap is made from hot dip galvanized steel.

In yet another implementation, the protective cap is made by injection molding. The protective sleeve portion 402 may be made from the same material but may comprise a different or additional dye so that the protective sleeve portion 402 is visually distinguished from the closed tip portion 404. Various portions (e.g. diameters) of the protective sleeve portion 402 may be formed with different colors or other indicators to indicate to a user a particular size of the diameter of the protective sleeve portion 402. Similarly, various portions (e.g. diameters) of the closed tip portion 404 may be formed with different colors or other indicators to indicate to a user a particular size or particular diameter of the closed tip portion 404.

In another implementation, the closed tip portion 404 is formed such that the closed tip portion 404 may be inserted into another pipe end. Thus, a pipe end may be connected to another pipe segment without fusing or connecting the pipe end to the another pipe. In this way, subsequent work on the particular pipe end is facilitated—a stretch of pipe may thus be easily broken apart for subsequent work. Alternatively, due to the shape of the closed tip portion 404, a protective cap 400 may be stacked on another protective cap 400 such as for storage, or ease of use, of a series of protective caps.

Figures 5, 5A:
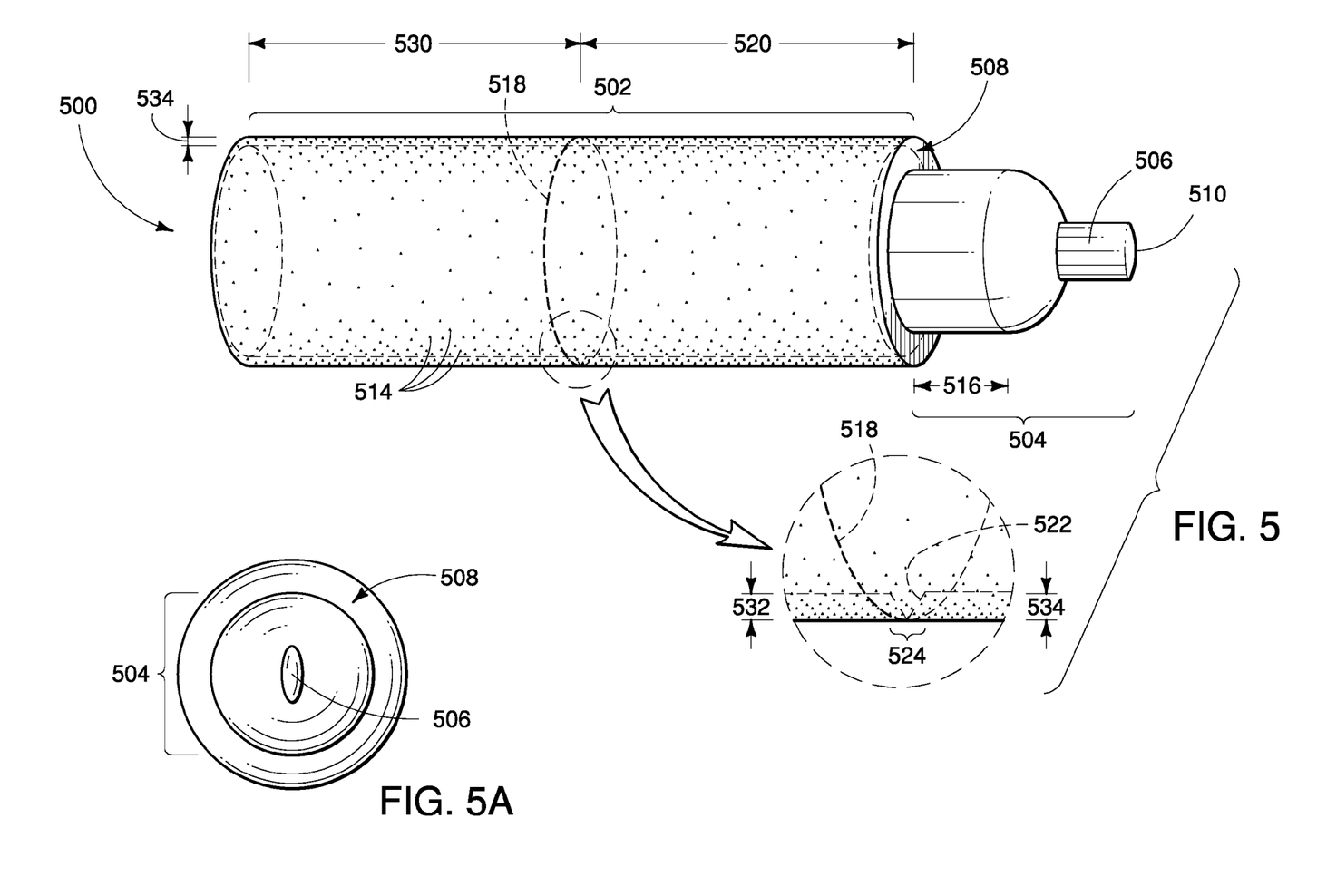
FIG. 5 is a perspective view of a protective cap according to a fifth exemplary implementation.

FIG. 5 is a perspective view of a protective cap 500 according to a fifth exemplary implementation of the subject matter. With reference to FIG. 5, a protective cap 500 comprises a protective sleeve portion 502 and a closed tip portion 504.

The outer surface of the protective sleeve portion 502 comprises a texture 514. In an exemplary implementation, a polyurethane spray is applied along with particles (such as rubber particles) to form the texture 514. The texture 514 may be thin or heavy. The texture 514 may be colored with a single color, a plurality or combination of colors, or a pattern of a single color or plurality of colors. The texture 514 may be formed into rings or bands on the protective sleeve portion 502. The texture 514 thus can serve to uniquely identify the protective cap 500. In other implementations, the texture 514 may be formed directly as part of or directly in the material used to make the protective cap 500.

The closed tip portion 504 comprises a distal end 510. In an exemplary implementation, the side surface or surfaces 506 of the distal end 510 of the protective cap 500 are relatively smooth. FIG. 5A shows an overhead view of the protective cap 500 shown in FIG. 5. With reference to FIG. 5A, in one implementation, the closed tip portion 504 is ovoid or wedge-shaped. Such cross-sectional shape of the distal end 510 facilitates insertion or manipulation of a corresponding pipe segment or pipe end (not shown) at a construction site. The cross-sectional shape of the distal end 510 also facilitates manual twisting of the protective cap 500. The height 516 of the distal end 510 is arbitrary, but is preferably sufficient for an installer to use a thumb and fingers to apply a twisting force to the protective cap 500. In other implementations, the height 516 is sufficient to apply a general purpose or specific purpose tool to be applied to the distal end 510 of the protective cap 500.

In one implementation, the side surface or surfaces 506 of the distal end 510 are brightly colored. The bright color or colors provide a visual cue to a worker that a cap remains on a pipe end and further work is required to complete the pipe end. Further, the presence of a bright cap provides a readily seen indicator that a pipe end is not properly exposed for receiving further work such as another pipe end prepared with a chemical adhesive or sealant.

The closed tip portion 504 also comprises a stepped shoulder 508. The stepped shoulder 508 provides a mechanism to stack protective caps 500 together, one on top of the other, distal end 510 of one protective cap 500 inserted into proximal end of another protective cap. The stepped shoulder 508 provides for ease of handling, storage and transportation. The height 516 of the stepped shoulder 508 is arbitrary. However, this height 516 is sufficient to maintain successive protective caps 500 stacked.

In another implementation of the protective cap 500, with reference to FIG. 5, the protective sleeve portion 502 also comprises a break-away or frangible region 518. The frangible region 518 allows for the breaking away of a top portion 520 (or other part) of the protective sleeve portion 502 and the closed tip portion 504 of the protective cap 500. While one frangible region 518 is shown in FIG. 5, multiple frangible regions are possible and often desirable. If multiple frangible regions are available, the frangible region closest to the proximal end of the protective cap 500 can be broken leaving a ring of the sleeve portion 502 on a pipe end. In this fashion, the protective cap can be repeatedly used, leaving behind rings of the sleeve portion 502 until all of the available rings of the sleeve portion 502 are used up. At that point, the protective cap 500 can be discarded.

In an exemplary implementation, the frangible region 518 is formed by a narrowed thickness 522 over a frangible width 524 in the wall of the protective sleeve portion 502. By breaking away the top portion 520 of the protective sleeve portion 502, the lower portion 530 of the protective sleeve portion 502 may be left behind on a pipe or pipe end and thus may continue to serve as a pipe marker even after the protective cap 500 is no longer being used.

In yet another implementation, the thickness 532 of the lower portion 530 of the protective sleeve portion 502 is thinner than the thickness 534 of the top portion 520 of the protective sleeve 502. The thinner lower portion 530 thus is able to slide more easily along the length of a pipe or pipe end after it is detached from the top portion 520 of the protective sleeve portion.

In yet another implementation, the thickness of the entire protective cap 500, including the closed end portion, may be thinner than the pipe on which the protective cap is placed. In such implementation, in principle, the entire protective cap is weaker in construction than the pipe or tube on which the protective cap is placed. When a protective cap is desired to be removed, the protective cap can even be destructively removed without damaging the pipe or pipe end on which the protective cap is placed.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

The invention claimed is:

1. A removable protective cap comprising:
  a sleeve portion having a sleeve length for fitting over an end of a construction material;
  a closed tip portion including (1) a tapered section that is tapered on its outer surface and (2) a distal end, and wherein the closed tip portion extends beyond the end of the construction material when the removable protective cap is removably mated to the end of the construction material, and wherein the closed tip portion further includes a major blade and a minor blade, and wherein said major blade extends substantially to the distal end of the closed tip portion, and wherein the major blade and the minor blade extend radially outward from a center longitudinal axis of the removable protective cap.

2. The removable protective cap of claim 1 wherein the sleeve portion includes gripping features, and wherein the gripping features include an identifying color, and wherein the identifying color of the gripping features is a different color than a color of the sleeve portion.

3. The removable protective cap of claim 1 wherein the removable protective cap includes an identifying number.

4. The removable protective cap of claim 1 further comprising text formed on the protective cap.

5. The removable protective cap of claim 1, and wherein the construction material is a pipe, and wherein the sleeve portion is capable of forming a seal over a pipe end of a pipe of a given outer diameter, and wherein the closed tip portion is capable of forming a seal in at an inner diameter of the end of the pipe of the said given outer diameter.

6. The removable protective cap of claim 1, and wherein the removable protective cap further comprises an identifying texture on at least a portion of the removable protective cap.

7. The removable protective cap of claim 6, and wherein the removable protective cap further comprises a ring, and wherein the identifying texture is on the ring.

8. The removable protective cap of claim 1, and wherein the removable protective cap is made of a colored material.

9. The removable protective cap of claim 1, and wherein the sleeve portion is formed into a first portion having a first inner dimension and a second portion having a second inner dimension, and wherein said inner dimensions correspond to construction materials of different outer dimensions.

* * * * *